United States Patent
Bien et al.

(10) Patent No.: US 12,092,745 B2
(45) Date of Patent: Sep. 17, 2024

(54) METHOD FOR GNSS-BASED LOCALIZATION OF A VEHICLE WITH EPHEMERIS DATA PLAUSIBILITY CHECKING

(71) Applicant: Robert Bosch GmbH, Stuttgart (DE)

(72) Inventors: Tomasz Bien, Ludwigsburg (DE); Jens Strobel, Freiberg am Neckar (DE); Marco Limberger, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 193 days.

(21) Appl. No.: 17/806,636

(22) Filed: Jun. 13, 2022

(65) Prior Publication Data
US 2022/0397679 A1 Dec. 15, 2022

(30) Foreign Application Priority Data
Jun. 14, 2021 (DE) .......................... 102021206038.2

(51) Int. Cl.
*G01S 19/08* (2010.01)
*G01S 19/05* (2010.01)
*G01S 19/24* (2010.01)

(52) U.S. Cl.
CPC .............. *G01S 19/08* (2013.01); *G01S 19/05* (2013.01); *G01S 19/24* (2013.01)

(58) Field of Classification Search
CPC ........... G01S 19/08; G01S 19/05; G01S 19/24
USPC ..................................... 342/357.42
See application file for complete search history.

(56) References Cited

FOREIGN PATENT DOCUMENTS

| WO | WO-2015193453 A2 | * | 12/2015 | ........... G01S 19/215 |
|----|------------------|---|---------|-----------------------|
| WO | WO-2019216133 A1 | * | 11/2019 | ............. G01C 17/38 |
| WO | WO-2024015144 A1 | * | 1/2024  | ............. G01S 19/24 |

* cited by examiner

*Primary Examiner* — Harry K Liu
(74) *Attorney, Agent, or Firm* — Maginot, Moore & Beck LLP

(57) ABSTRACT

A method for GNSS-based localization of a vehicle includes receiving a first set of satellite orbit data, using the first set of satellite orbit data when determining a first localization result, receiving a second set of satellite orbit data, checking a plausibility of the first set of satellite orbit data using the second set of satellite orbit data, and manipulating the first set of satellite orbit data and/or the first localization result and/or a localization filter when the plausibility check was not successful.

10 Claims, 3 Drawing Sheets

METHOD FOR GNSS-BASED LOCALIZATION OF A VEHICLE WITH EPHEMERIS DATA PLAUSIBILITY CHECKING

This application claims priority under 35 U.S.C. § 119 to patent application no. DE 10 2021 206 038.2, filed on Jun. 14, 2021 in Germany, the disclosure of which is incorporated herein by reference in its entirety.

The disclosure relates to a method for GNSS-based localization of a vehicle, in particular with ephemeris data plausibility checking. Also specified are a computer program for carrying out the method, a machine-readable storage medium on which the computer program is stored, and a vehicle localization device configured to carry out the method. The disclosure can be applied in particular to GNSS-based localization systems for autonomous or semi-autonomous driving.

BACKGROUND

A global navigation satellite system (GNSS) refers to a constellation of satellites that provide signals from space that transmit position and time data to GNSS receivers. The receivers then use this data to determine a location. GNSS systems are widely used in many application areas such as the automotive industry, surveying, avionics, and agriculture, providing a cost-effective, continuous and global positioning solution. In order to meet the high requirements for accuracy, availability and integrity in automated and assisted driving applications, multi-GNSS (e.g. GPS, Galileo, Glonass and/or Beidou) and/or multi-frequency signals are usually processed and GNSS correction services for correcting signal propagation time errors (signal-in-space errors) are taken into account in order to calculate the most precise and reliable positioning solution possible.

Each GNSS satellite continuously transmits a radio signal that contains the current time and data about its position as part of the so-called navigation message. Since the speed of radio waves is constant and independent of the satellite speed, the time delay between the time at which the satellite sends a signal and the receiver receives it is proportional to the distance of the satellite from the receiver. A GNSS receiver monitors multiple satellites and solves equations to determine the exact position of the receiver and its deviation from the true time. At least four satellites should be in the receiver's field of view so that it can calculate four unknown quantities (three position coordinates and receiver clock error). GNSS almanac and ephemeris data usually form the navigation message transmitted by each satellite and contain information such as the week number, the accuracy and status of the satellites, the age of the data, the correction coefficients of the satellite clock, and/or the orbital parameters. The validity period of the parameters depends on the GNSS. In the case of GPS, they are valid for two hours before and two hours after the time of the ephemeris (TOE). The TOE can be thought of as the time at which the data was calculated from the GNSS control segment.

This data is used for real-time satellite coordinate calculation, which is particularly beneficial for position calculation. Therefore, the highest possible availability of the most reliable ephemeris data is particularly desirable in order to obtain the most reliable position calculation possible.

SUMMARY

A method for GNSS-based localization of a vehicle position is proposed, comprising at least the following steps: a) receiving a first set of satellite orbit data, b) using the first set of satellite orbit data when determining a first localization result, c) receiving a second set of satellite orbit data, d) checking the plausibility of the first set of satellite orbit data using the second set of satellite orbit data, and e) manipulating the first set of satellite orbit data and/or the first localization result and/or a localization filter if the plausibility check was not successful.

The satellite orbit data here can refer to or comprise ephemeris data and/or almanac data. Preferably, the respective satellite orbit data is ephemeris data.

For example, steps a), b), c), d), and e) may be carried out at least once and/or repeatedly in the order indicated to carry out the method. Furthermore, steps a), b), c), d) and e), in particular steps c) and d), can be carried out at least partially in parallel or simultaneously. In particular, steps a), b), c), d) and e) may be carried out on the vehicle or by means of a GNSS receiver and/or a GNSS sensor of a vehicle. The method can contribute in an advantageous way to a confirmation check of the GNSS navigation data.

The vehicle could be a car, for example, which is preferably configured for at least partially automated and/or autonomous driving. The GNSS-based localization can involve, for example, a localization which is only or exclusively GNSS-based or a localization based on other sensor data of the vehicle and/or map data, as well as other vehicle sensor data and/or map data. The sensor data can be inertial sensor data (IMU data) and/or environment sensor data, for example.

In step a), a first set of satellite orbit data is received. The (first and/or second) satellite orbit data in this context, for example, can be received via a GNSS receiver or a GNSS antenna of the vehicle. The GNSS receiver can decode the satellite orbit data from received GNSS signals. Within a suitable decoding process, the GNSS payload can be converted into a bit stream containing information about the orbits that can be reused for positioning. Generally, however, a corresponding decoding process can be susceptible to decoding errors, in particular for signals with low signal strength relative to the noise level, such as in GNSS signals. The method can help identify these decoding errors.

In step b), the first set of satellite orbit data is used (directly or directly) to determine a first localization result. This advantageously allows a particularly high availability by using the first received set of satellite orbit data for a first or initial localization (so-called "first fix"). In particular, the first set of satellite orbit data is used without checking or plausibility checking it (in advance) with another set of satellite orbit data. For example, the first set of satellite orbit data can be used (immediately or directly), in particular before the second set of satellite orbit data is received.

In step c), a second set of satellite orbit data is received. For example, the second set of satellite orbit data may differ from the first set of satellite orbit data in that it was received at a later time. In principle, the second set of satellite orbit data can relate to the same satellite constellation as the first set of satellite orbit data.

In step d) the plausibility of the first set of satellite orbit data is checked with the second set of satellite orbit data. For example, the plausibility check can comprise a comparison of the two sets of satellite orbit data. The plausibility check can be regarded as successful or the satellite orbit data as plausible if the two sets of satellite orbit data are essentially the same or consistent. The plausibility check can be regarded as unsuccessful or the satellite orbit data as implausible if the two sets of satellite orbit data show a significant difference (at the bit level) to each other or are not consistent.

Plausibility checking the first set of satellite orbit data with the second set of satellite orbit data can advantageously help to increase confidence in the received satellite orbit data. The plausibility check can be carried out, for example, in the form of a satellite path monitoring step. In addition, a corresponding response can be made on the user side in step e). For example, approaches based on cross-plausibility checks between satellite orbit data sets can be used as monitoring approaches. In particular, any newly received data set of ephemeris and/or almanac data can be compared with the previously received data set.

In step e), the first set of satellite orbit data and/or the first localization result and/or the first localization filter are manipulated, in particular reset, if the plausibility check was not successful. The manipulation can comprise, for example, a weighting or resetting. For example, the weighting can comprise a corresponding weighting of the satellites. For example, the resetting may comprise deleting or invalidating the first localization result and/or the first set of satellite orbit data. The method thus advantageously provides an additional security/integrity mechanism for a GNSS positioning system by verifying the satellite orbit data (satellite orbit information) without affecting availability in most use cases. A particular advantage of the method is the fact that the plausibility check only has an impact on the availability of the GNSS receiver in the event that incorrect (e.g. incorrectly decoded) satellite orbit data is provided. In particular since the described plausibility check or monitoring runs in parallel and verifies the correctness of the satellite orbit data, it advantageously has as little effect as possible on the availability of the satellite orbit data, in particular if the satellite orbit data is correct.

At least the plausibility check according to step d) and/or the manipulation according to step e) can be carried out taking into account the current situation of the vehicle. Thus, situation-dependent requirements in terms of security and availability can be taken into account in an advantageous way. For example, it is possible to take into account whether the vehicle is in a starting or driving situation. Alternatively or in addition, it is possible to take into account, for example, whether the vehicle is located in an area where a GNSS reception is expected to be degraded, such as a city or a built-up area (with street canyons).

This can advantageously help to allow the proposed method to represent the best possible compromise between integrity and availability, for example by means of different responses during start-up (initial reception of the ephemeris and/or almanac data) and during operation, when particular emphasis is placed on an appropriate response given the situation when more security or availability is desired. This flexibility can advantageously enable an appropriate adaptation of the plausibility check in accordance with step d) and/or the reset in accordance with step e), for example, for situations in urban areas where the probability of bit errors in the navigation data due to satellite signal interference is significantly higher than in motorway scenarios in open spaces.

According to an advantageous embodiment, it is proposed that the first set of satellite orbit data is used for initializing a localization filter. For example, the localization filter can be a Kalman filter or Least-Squares filter. For example, the localization filter can be a component of a localization device also described here. For example, the localization filter can receive data from various sensors in the vehicle and output a localization result, in particular comprising the current position, speed and/or orientation of the vehicle. For example, the vehicle's sensors can comprise at least one GNSS antenna, at least one inertial sensor (IMU), and/or at least one environment sensor. Furthermore, the localization filter can take into account map data from a digital map, for example in the manner of a so-called map matching procedure.

According to a further advantageous embodiment, it is proposed that the first localization result comprises an initial vehicle position. The initial vehicle position can be described as a so-called "first fix". The initial vehicle position is usually the first determined vehicle position, or the first determined vehicle position after the vehicle has started. The first localization result can represent a preliminary initial vehicle position, which can be confirmed, for example, after the plausibility check in accordance with step d) or by means of the plausibility check in accordance with step d).

According to a further advantageous embodiment, it is proposed that the first localization result is reset if the plausibility check was not successful. This may comprise deleting the first localization result, for example.

According to a further advantageous embodiment, it is proposed that the first set of satellite orbit data is reset if the plausibility check was not successful. This can comprise deleting the first set of satellite orbit data, for example. Furthermore, in this context it may comprise resetting or deleting a satellite orbit database, in particular on-board the vehicle.

According to a further advantageous embodiment, it is proposed that a localization filter is reset if the plausibility check was not successful. For example, such a reset can involve modifying, in particular deleting, at least one setting parameter of the localization filter.

According to a further advantageous embodiment, it is proposed that the steps a) to e) be repeated after a pre-definable time interval. For example, the time interval may be defined depending on the GNSS services(s) currently available or received. For GPS, for example, the time interval can be two hours.

According to a further aspect, a computer program is proposed for implementing a method presented here. In other words, this relates in particular to a computer program (product), comprising commands which during the execution of the program by a computer, cause it to execute a method described here.

According to a further aspect, a machine-readable storage medium is proposed, on which the computer program proposed here is deposited or stored. Typically, the machine-readable storage medium is a computer-readable data carrier.

According to a further aspect, a localization device for a vehicle is proposed, which is configured to carry out a method described here. For example, the localization device can comprise a computer and/or a control unit (controller) that can execute commands to carry out the method. To do this, for example, the computer or control unit can execute the specified computer program. For example, the computer or control unit can access the specified storage medium in order to be able to execute the computer program. For example, the localization device may be a component of a motion and position sensor that is or can be arranged, in particular, in or on a vehicle, or may be connected to such a sensor for information exchange.

The details, features and advantageous designs discussed in connection with the method may also occur accordingly in the computer program and/or storage medium and/or localization device presented here, and vice versa. In this respect reference is made to the comments made there for further characterization of the features in their full extent.

BRIEF DESCRIPTION OF THE DRAWINGS

The solution presented here as well as its technical background will be explained in more detail below on the basis of the figures. It should be noted that the disclosure is not intended to be limited by the exemplary embodiments. In particular, unless explicitly indicated otherwise, it is also possible to extract partial aspects of the facts explained in the figures and to combine them with other components and/or information from other figures and/or the present description. In the schematic drawings.

DETAILED DESCRIPTION

Figure 1:
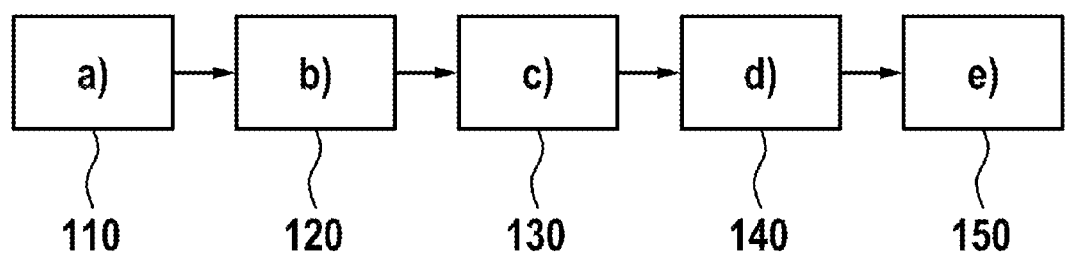
FIG. 1 shows an exemplary sequence of the method presented here.

FIG. 1 shows a schematic diagram of an exemplary sequence of the method presented here. The method is used for GNSS-based localization of a vehicle 1. The sequence of steps a), b), c), d) and e) shown with blocks 110, 120, 130, 140 and 150 is exemplary and can be performed at least once in the sequence shown to carry out the method.

In block 110, a first set of satellite orbit data is received in accordance with step a). In block 120, the first set of satellite orbit data is used to determine a first localization result in accordance with step b). In block 130, a second set of satellite orbit data is received in accordance with step c). In block 140, the plausibility of the first set of satellite orbit data is checked with the second set of satellite orbit data in accordance with step d). In block 150, in accordance with step e), the first set of satellite orbit data and/or the first localization result and/or the first localization filter are manipulated if the plausibility check was not successful.

For example, hardware or software errors during the decoding of the satellite orbit data may possibly lead to incorrect orbit information and thus to the use of an incorrect pseudo-range for the GNSS positioning. This could lead to potentially significant positioning errors, which could be a problem, in particular in safety- and integrity-critical applications such as autonomous or automated driving. On the other hand, in safety-critical systems the aim is to achieve the highest possible availability and, in particular, an unnecessary extension of the start-up phase could reduce the acceptance of the system.

By means of the plausibility check (of the satellite paths or orbits), the method advantageously allows an additional safety margin, in particular without adversely affecting the availability, if no decoding error is present in the satellite orbit data. Nevertheless, the (direct) use of the first set of satellite orbit data prior to the plausibility check can advantageously assist in increasing the availability using the method.

For example, the first set of satellite orbit data can be used to initialize a localization filter. Furthermore, the first localization result can comprise an initial vehicle position (so-called first fix). In particular, there is no need to wait for the second set of satellite orbit data to be received before a (possibly provisional) initial vehicle position is determined.

If necessary, the first localization result can be reset if the plausibility check was not successful. The plausibility check is unsuccessful in particular if the two sets of satellite orbit data are inconsistent.

Furthermore, the first set of satellite orbit data can be reset if the plausibility check was not successful. In particular if the two sets of satellite orbit data are inconsistent, at least the first set of satellite orbit data can be deleted and the method may be started at least partly from scratch for one or more satellites (possibly using the second set of satellite orbit data as the first set of satellite orbit data).

A localization filter can also be reset if the plausibility check was not successful. The localization filter can be a Kalman filter, for example.

In addition, steps a) to e) can be repeated after a predefinable time interval. For example, for the GNSS system the time interval can be specified as two hours.

Figure 2:
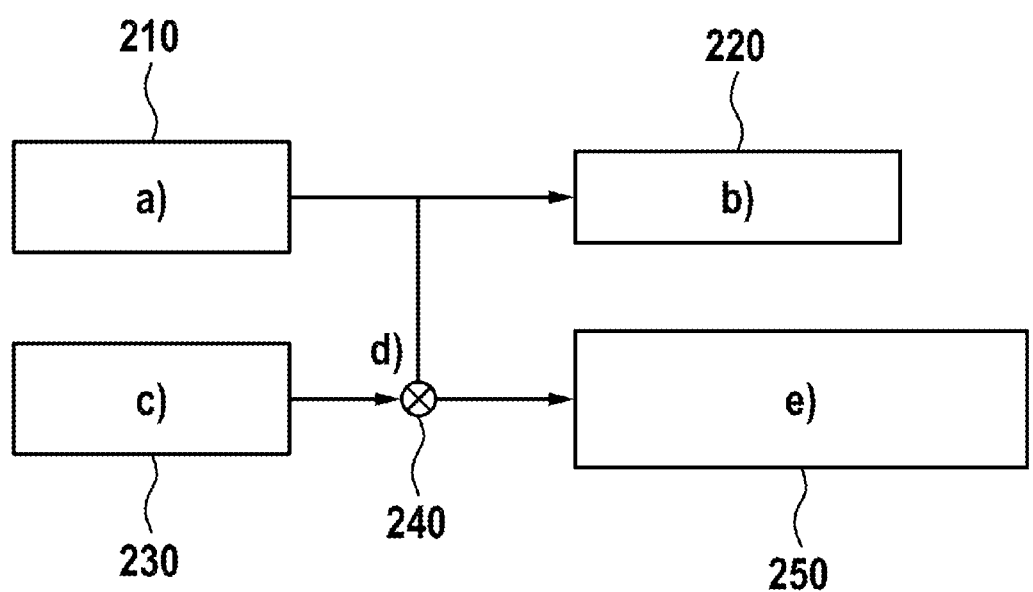
FIG. 2 shows a flow diagram according to which one exemplary embodiment of the method can be realized.

FIG. 2 shows a schematic flow diagram, according to which one exemplary embodiment of the method can be realized. The method can be divided (conceptually) into two sections, namely a monitoring for the ephemeris data (blocks 210 to 240) and an action in the event of an ephemeris error (block 250).

In block 210, the ephemeris data is received for the first time. This may represent receiving a first set of satellite orbit data in accordance with step a).

In block 220, the first set of ephemeris data can already be used for the GNSS position calculation (e.g. initialization of the GNSS Kalman filter), which advantageously allows a quick start. This may represent using the first set of satellite orbit data in determining a first localization result, in accordance with step b).

In block 230, the second set of ephemeris data can be received with the same version of the data ephemeris (IODE) as the first set. This represents an example of the fact that, and possibly how, a second set of satellite orbit data can be received in accordance with step c).

In block 240, both sets of ephemeris data can be compared with each other. If the data sets are not identical, a monitor will detect an incorrect ephemeris set. This is an example of the fact that, and possibly how, the first set of satellite orbit data can be plausibility checked with the second set of satellite orbit data, in accordance with step d).

If the monitoring part (blocks 210 to 240) detects incorrect ephemeris data, the method can proceed to the handling part (block 250). In block 250 one or more of the following measures can be carried out (in combination with each other or separately) to manipulate the first localization result and/or the first set of ephemeris data (in accordance with step e)). First, the (first) ephemeris data set of the affected satellite or satellites with faulty ephemeris data can be discarded or used with an additional (devaluing) weighting parameter for the GNSS position calculation. Second, the (first) ephemeris data set of the affected satellite or satellites with faulty ephemeris data can be discarded or used with an additional warning for the time measurement (due to a possible incorrect decoding of the week number or the leap second information). Third, calculations that may be based on incorrect ephemeris data can be discarded or used with additional (devaluing) weighting.

The latter calculations may concern, but are not limited to, one or more of (i) initialization parameters for GNSS position determination and/or time calculation (e.g. Kalman filter states, etc.); learned sensor offsets (e.g. IMU offsets learned from the GNSS position calculation, etc.); and/or estimated satellite corrections (for example, in case the receiver is used as a reference station).

Figure 3:
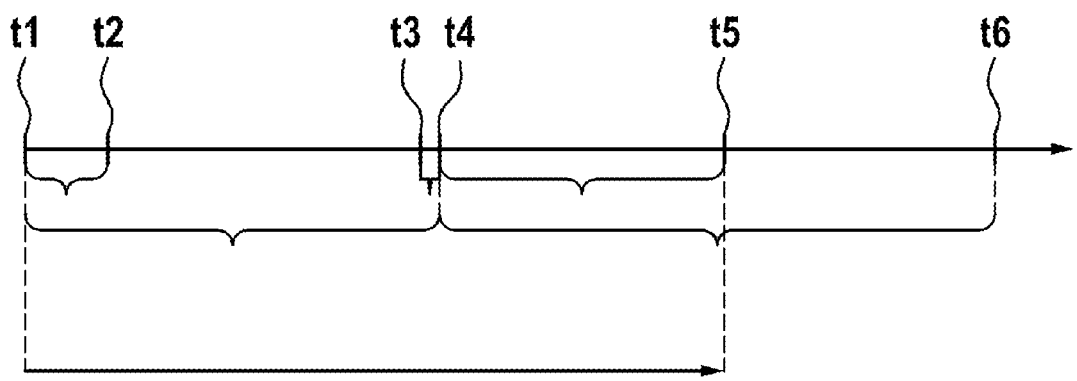
FIG. 3 shows an illustration of an exemplary sequence of the method by means of a timeline.

FIG. 3 shows a schematic illustration of an exemplary sequence of the method by means of a timeline.

At time t1, the vehicle is started. At time t2, the satellite tracking begins. At time t3, the first set of satellite orbit data is received. At t4, the first set of satellite orbit data is used to determine a first localization result (so-called first fix). At time t5, the second set of satellite orbit data is received. At time t6, in this example a successful plausibility check is carried out so that the regular localization process can be continued.

Figure 4:
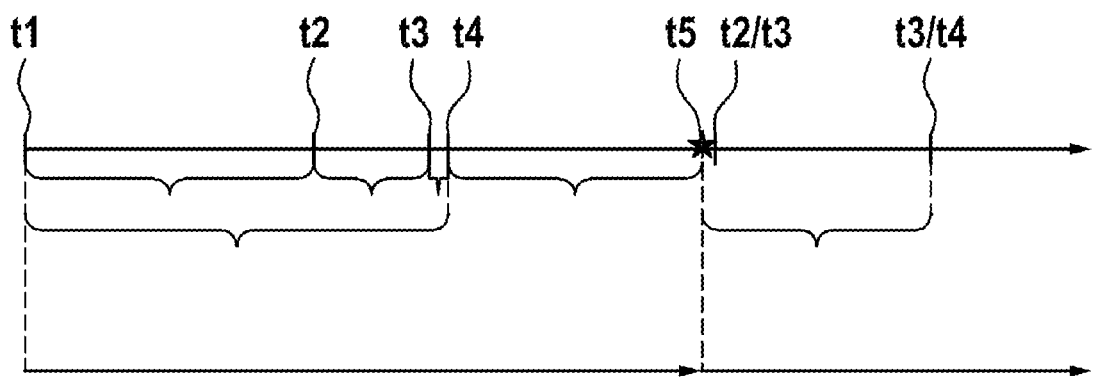
FIG. 4 shows an illustration of a further exemplary sequence of the method by means of a timeline.

FIG. 4 shows a schematic illustration of a further exemplary sequence of the method by means of a timeline. In contrast to the sequence according to FIG. 3, in this case at time t5 a second set of satellite orbit data is received which is inconsistent with the first set of satellite orbit data previously received at t3, so that the plausibility check is not successful. The method can then start again with, for example, time t3 (reception of a new first set of satellite orbit data). However, the method could also be (alternatively) continued with a new time t4 (first fix), especially if the (second) set of satellite orbit data received at t5 is defined as the new first set of satellite orbit data.

Figure 5:
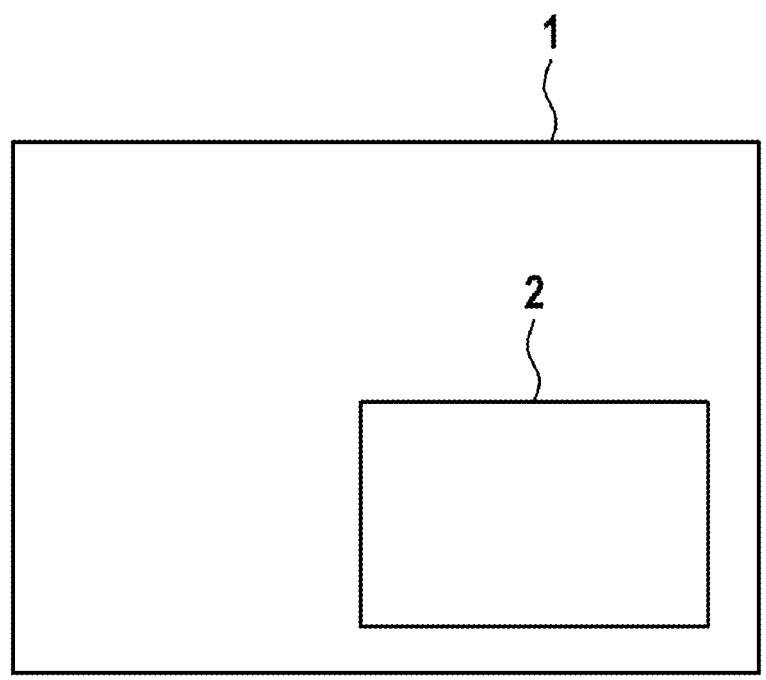
FIG. 5 shows an example of a vehicle with a localization device as described here.

FIG. 5 shows a schematic drawing of an example of a vehicle 1 with a localization device 2 described here. The localization device 2 is configured to carry out a method described here.

The method contributes in an advantageous way to enabling the maximum possible availability of the most reliable possible ephemeris and/or almanac data for a maximally reliable position calculation.

What is claimed is:

1. A method for GNSS-based localization of a vehicle, comprising:
   receiving a first set of satellite orbit data at a first time;
   using the first set of satellite orbit data to determine a first localization result;
   receiving a second set of satellite orbit data at a second time that is subsequent to the first time;
   checking a plausibility of the first set of satellite orbit data by comparing the first set of satellite orbit data with the second set of satellite orbit data, the plausibility check being unsuccessful if the first set of satellite orbit data is inconsistent with the second set of satellite orbit data; and
   manipulating the first set of satellite orbit data, the first localization result, and/or a localization filter when the plausibility check is unsuccessful.

2. The method as claimed in claim 1, further comprising:
   initializing the localization filter using the first set of satellite orbit data.

3. The method as claimed in claim 1, wherein the first localization result comprises a first vehicle position of the vehicle.

4. The method as claimed in claim 1, wherein the first localization result is reset when the plausibility check is unsuccessful.

5. The method as claimed in claim 1, wherein the first set of satellite orbit data is reset when the plausibility check is unsuccessful.

6. The method as claimed in claim 1, wherein the localization filter is reset when the plausibility check is unsuccessful.

7. The method as claimed in claim 1, wherein the method is repeated after a pre-definable time interval.

8. The method as claimed in claim 1, wherein a computer program is configured for carrying out the method.

9. The method as claimed in claim 8, wherein the computer program is stored on a non-transitory machine-readable storage medium.

10. The method as claimed in claim 1, wherein a localization device for the vehicle is configured to carry out the method.

* * * * *